United States Patent [19]

Kawabe

[11] Patent Number: 4,628,388
[45] Date of Patent: Dec. 9, 1986

[54] HEAD CLEANING APPARATUS

[75] Inventor: Hirokazu Kawabe, Tokyo, Japan

[73] Assignee: Kabushiki Kaisha Nagaoka, Japan

[21] Appl. No.: 742,409

[22] Filed: Jun. 7, 1985

[30] Foreign Application Priority Data

Nov. 27, 1984 [JP]  Japan ................................ 59-249967

[51] Int. Cl.⁴ .......................... G11B 23/03; A47L 1/00
[52] U.S. Cl. .................................... 360/128; 360/133;
15/210 R; 15/246; 15/104.92
[58] Field of Search ....................... 360/128, 133, 137;
15/210 R, 246, 104.92

[56] References Cited

FOREIGN PATENT DOCUMENTS 0127919  8/1982  Japan .................................. 360/128
0158018  9/1983  Japan .................................. 360/128

Primary Examiner—Robert S. Tupper
Assistant Examiner—Andrew L. Sniezek
Attorney, Agent, or Firm—James E. Nilles

[57] ABSTRACT

A head cleaning apparatus wherein in a case formed to the same shape and dimension of a hard case of hard-cased floppy disks a cleaning sheet formed to the same shape and dimension of the magnetic disk of floppy disk is rotatably installed. The cleaning sheet has microcapsules containing cleaning liquid on both sides of the sheet.

8 Claims, 14 Drawing Figures

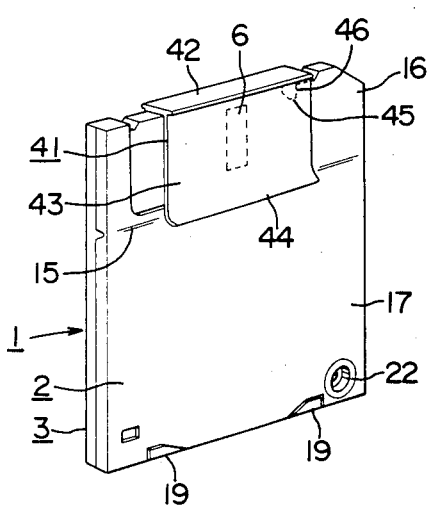
FIG. 9
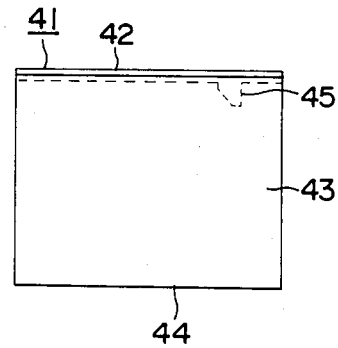
FIG. 10
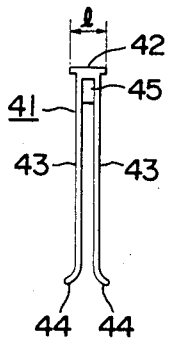
FIG. 11
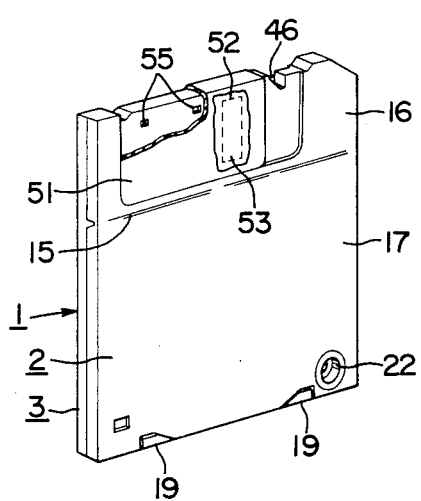
FIG. 12
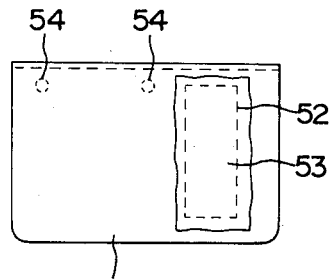
FIG. 13
FIG. 14

HEAD CLEANING APPARATUS

BAKGROUND OF THE INVENTION

1. Field of the Invention

The present invention relates to a head cleaning apparatus for cleaning a drive head of an equipment that uses hard-cased floppy disks of, for instance, 3.5 inch size.

2. Description of the Prior Art

Various kinds of drive head cleaning apparatuses for equipment that uses floppy disk have been proposed, many of them designed to clean the drive head for the floppy disk consisting of a magnetic disk contained in a soft resin jacket.

The cleaning apparatus of conventional construction as it is, therefore, cannot be used for cleaning the drive head for the hard-cased floppy disk.

SUMMARY OF THE INVENTION

This invention has been accomplished to overcome the above problem i.e., to provide a cleaning apparatus capable of easily cleaning the drive head of an equipment that uses hard-cased floppy disk.

The head cleaning apparatus of this invention consists of: a case formed to the same shape and dimension of the hard case of the hard-cased floppy disk; and a cleaning sheet rotatably installed in the case, the cleaning sheet formed to the same shape and dimension of the magnetic disk of the floppy disk, the cleaning sheet having on both sides microcapsules each containing cleaning liquid.

A number of microcapsules containing cleaning liquid attached to both sides of the cleaning sheet are pressed and broken by the head to spread the cleaning liquid over the cleaning sheet surface.

Other objects and features of this invention will become apparent from the following descriptions in conjunction with the attached drawings.

BRIEF DESCRIPTION OF THE DRAWINGS

FIG. 9 is a perspective view of a head cleaning apparatus of the other embodiment of the invention with a shutter for a double head;

FIG. 10 is a front view of a cover for the head cleaning apparatus shown in FIG. 9;

FIG. 11 is a side view of the cover shown in FIG. 10;

FIG. 12 is a perspective view of the head cleaning apparatus shown in FIG. 9 having a shutter for a single head with a portion thereof cut away;

FIG. 13 is a front view of the shutter for the single head; and

FIG. 14 is a side view of the shutter shown in FIG. 13.

DESCRIPTION OF THE PREFERRED EMBODIMENT

Figure 1:
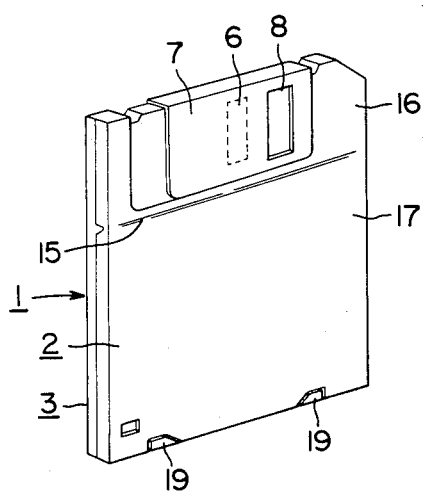
FIG. 1 is a perspective view of a head cleaning apparatus of this invention.
Figure 2:
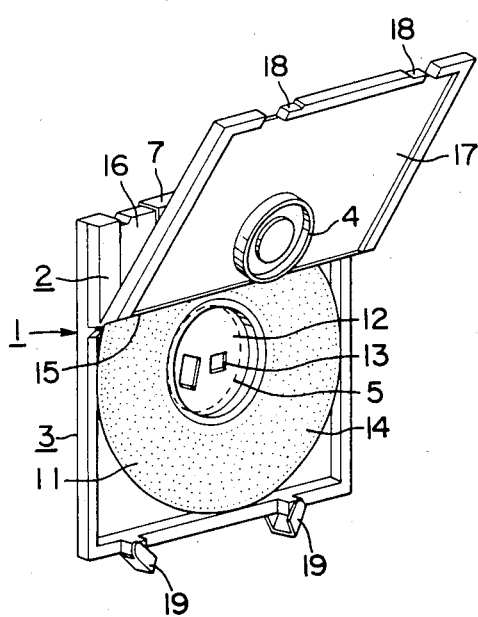
FIG. 2 is a perspective view of a head cleaning apparatus of FIG. 1 with a cover opened.

Referring to FIGS. 1 and 2, denoted 1 is a square flat case made of synthetic resin which is formed to the same shape and dimension of the hard case of the hard-cased floppy disk of, for instance, 3.5 inch size. The case 1 consists of a pair of side plates 2, 3 held together with outer peripheral portions contacting each other. One of the side plates 2 has a cylindrical hub support 4 formed at the center of the inner side. The other side plate 3 has a circular through hole 5 at the center corresponding to the hub support 4. Rectangular head holes 6 are formed in the side plates 2, 3 at the center of the upper part of the plates so that the head holes 6 oppose each other. A metal shutter 7, shaped like a letter U in cross section, is mounted laterally slidable on the upper end of the side plates 2, 3. The shutter 7 has a pair of opposing windows 8 at one end on both legs so that they are in line with the head holes 6. The shutter 7 is urged by a spring (not shown) in such a direction as to close the head holes 6, and when the case 1 is inserted into the head of an equipment the same way as with the floppy disk, the shutter 7 moves to cause the window 8 to align with the head hole 6.

Designated 11 is a disk-like cleaning sheet into which cleaning liquid can be permeated. The cleaning sheet 11 is formed to the same shape and dimension to those of the floppy disk's magnetic disk contained in a hard case of, for instance, 3.5 inch. The sheet 11 has a metal hub 12 at the center, which also has a shaft engagement hole 13 formed at the center. The cleaning sheet 11 is fitted between the side plates 2, 3 of the case 1 with its hub 12 rotatably supported by the hub support 4.

Figure 3:
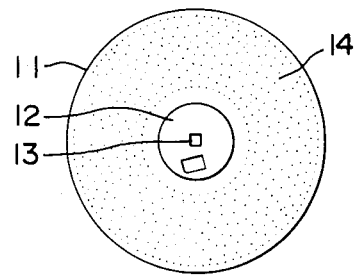
FIGS. 3 through 5 are plan view of the head cleaning sheet.
Figure 4:
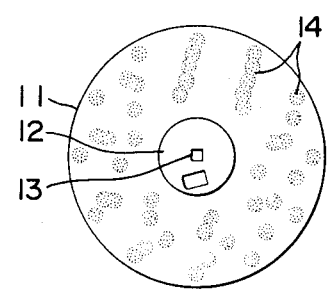
Figure 5:
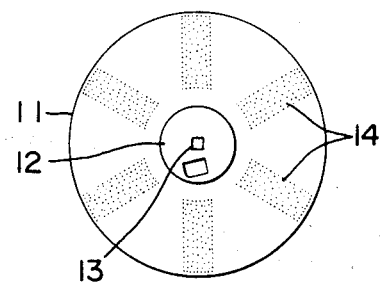

A large number of microcapsules 14 containing cleaning liquid is attached to the entire surface of the cleaning sheet 11 on both sides as shwon in FIG. 3. The microcapsules may also be scattered over and bonded to the surface of the cleaning sheet 11 as shown in FIG. 4 or arranged and bonded to the surface at intervals as shown in FIG. 5.

A thin hinge 15 is formed on the side plate 2 between the head hole 6 and the hub support 4. The side plate 2 also has a cover 17 which can be opened or closed, through the hinge 15, with respect to the fixed portion 16 at the upper end. The cover 17 has notched engagement sections 18 formed at the lower end on both sides. At the lower edge of the side plate 3 corresponding to the engagement sections 18, hooks 19 are rotatably fitted so that they engage with the engagement sections 18 of the side plate 2. Through the engagement and release of the hooks 19, the cover is opened and closed to install and remove the cleaning sheet 11.

In this construction, when the drive head of an equipment that uses a hard-cased floppy disk is to be cleaned, the case 1 is inserted into the head as with the floppy disk. As the case is inserted, the shutter 7 moves to align the window 8 with the head hole 6 and the equipment drive mechanism turns the cleaning sheet 11. The head is then put in a sliding contact with the both sides of the cleaning sheet 11 with the result that many microcapsules 14 are broken spreading cleaning liquid over the surfaces of the sheet on both sides. The head is then cleaned with the cleaning liquid on the sheet 11.

When the cleaning sheet 11 is contaminated, it is replaced by opening the cover 17.

The case 1 is always closed except when replacing the cleaning sheet 11, so dust is kept from entering from outside.

Figure 6:
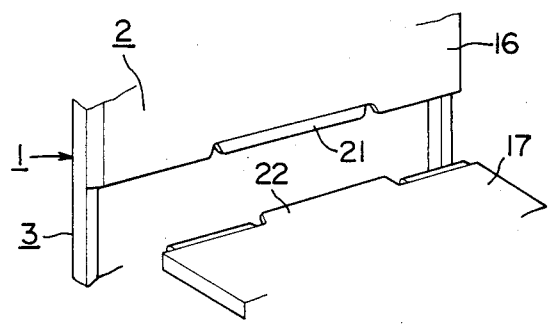
FIG. 6 is a perspective view of a part of another embodiment.
Figure 7:
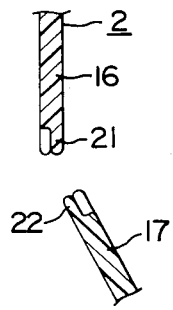
FIGS. 7 and 8 are partial cross sections of FIG. 6.
Figure 8:
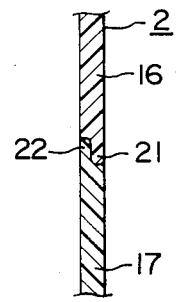

The cover 17 which in this embodiment is opened and closed by the hinge 15, may also be constructed such that, as shown in FIGS. 6 through 8, the cover 17 can be removed from the fixed portion 16 of the side plate 2 through engagement portions 21, 22 formed at the mating ends of the fixed portion 16 and the cover 17.

The case 1 may be made partially or totally transparent so that the cleaning sheet 11 can be seen from outside to permit check on the condition of contamination of the cleaning sheet 11 and consumption of microcapsules 14. The consumption of microcapsules 14 can be viewed even more distinctly by mixing into the cleaning liquid a substance that changes its color when contacted with oxygen in the air.

With this invention, since a large number of microcapsules containing cleaning liquid, which are attached on each side of the cleaning sheet, are pressed and broken by the head to spread the cleaning liquid over the cleaning sheet surfaces, it is possible to apply cleaning liquid to each side of the sheet without fail and to easily clean the drive head of an equipment that uses hard-cased floppy disks.

In the head cleaning apparatus of the above embodiment, the shutter 7 is provided movably with respect to the head holes 6 formed in the case 1, so that when the case 1 is inserted into and removed from the head portion of the equipment to be cleaned the shutter 7 is moved automatically to open and close the head holes 6.

However, the head holes 6 may be opened and closed by a cover operated by hand, instead of providing the shutter which is automatically opened and closed.

Specifically, in an embodiment shown in FIG. 9, a cover 41 is fitted on one side of the case 1 detachably with respect to the head holes 6. This cover 41 is made of a resilient synthetic resin as a unit and comprises an end plate 42 and two side plates 43, 43 spaced by a predetermined distance with each other and connected to said end plate 42 so as to shape like a letter U in cross-section as shown in FIGS. 10 and 11.

A guide portion 44 curved outwardly is provided at free end of each side plate 43. A projection 45 is provided on the inside of the end plate 42. The maximum thickness of the cover 41, that is, the width l of said end plate 42 is so determined that it is impossible to insert into the head portion of the equipment using the floppy disk. When said cover 41 is fitted on the one side of the case 1, the projection 45 is engaged with a cut portion 46 for positioning formed on one end of the case 1 to close the head holes 6.

When the head of an equipment that uses a hard-cased floppy disk is to be cleaned, the cover 41 is removed from the case 1 to open the head holes 6 and the case 1 is inserted into the head portion as with the floppy disk. Then the head is cleaned with the cleaning liquid permeated into the cleaning sheet 11 as in the first embodiment.

In this case, if it is tried to insert the case 1 into the head portion without removing the cover 41 from the case 1, the case 1 can not be inserted into the head portion because the width l of the end plate 42 is larger than the head portion, so that the misuse thereof can be prevented.

Further, in the embodiment shown in FIG. 9, the head holes 6 are formed on the both side plates of the case 1 so as to be used to an equipment of double head type. If the case 1 is in use for an equipment of single head type, a shutter 51 as shown in FIGS. 12-14 is used. The shutter 51 is made of a metal such as stainless steel and shaped like a letter U in cross section. On both side plates of said shutter 51 opening windows 52 are formed corresponding to said head holes 6. A sheet 53 of soft synthetic resin is attached on one window 52. One or a plurality of projections 54 are provided on the inside of one side plate of said shutter 51.

When the head cleaning apparatus is used for the equipment of single head type, the shutter 51 is fitted on one end portion of the case 1 after the cover 41 is removed as in the previous case, so that the shutter 51 is positioned by engaging projections 54 with concave engaging portions 55 formed on the case 1 so as to coincide the head holes 6 with the windows 52. When the case 1 is inserted into the head portion of the equipment, the sheet 53 on one window 52 is brought into contact with a portion facing to the head portion and at the same time the other window 52 is brought into contact with the head portion, so that the cleaning sheet 11 is put in a sliding contact with the head portion to clean it.

What is claimed is:

1. A head cleaning apparatus comprising: a case formed to the same shape and dimension of a hard case of hard-cased floppy disks; and a cleaning sheet rotatably installed in the case, the cleaning sheet formed to the same shape and dimension of the magnetic disk of a floppy disk, the cleaning sheet having microcapsules containing cleaning liquid attached on both sides of the sheet.

2. A head cleaning apparatus as defined in claim 1, wherein the case has a cover which can be opened and closed for replacing the cleaning sheet.

3. A head cleaning apparatus as defined in claim 1, wherein the case is made at least partially transparent so that the cleaning sheet can be seen from outside.

4. A head cleaning apparatus as defined in claim 2, wherein the case is made at least partially transparent so that the cleaning sheet can be seen from outside.

5. A head cleaning apparatus as defined in claim 1, wherein said cleaning liquid contains a substance that changes its color when contacted with oxygen in the air.

6. A head cleaning apparatus as defined in claim 2, wherein said cleaning liquid contains a substance that changes its color when contacted with oxygen in the air.

7. A head cleaning apparatus as defined in claim 3, wherein said cleaning liquid contains a substance that changes its color when contacted with oxygen in the air.

8. A head cleaning apparatus as defined in claim 4, wherein said cleaning liquid contains a substance that changes its color when contacted with oxygen in the air.

* * * * *